United States Patent
Kuzuya et al.

(10) Patent No.: US 10,157,327 B2
(45) Date of Patent: Dec. 18, 2018

(54) IMAGE PROCESSING DEVICE, IMAGE PROCESSING METHOD, AND PROGRAM

(71) Applicant: SONY SEMICONDUCTOR SOLUTIONS CORPORATION, Kanagawa (JP)

(72) Inventors: Naoki Kuzuya, Tokyo (JP); Kenichiro Oi, Kanagawa (JP); Hironaga Sano, Kanagawa (JP); Nana Matsumoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/500,270

(22) PCT Filed: Jul. 23, 2015

(86) PCT No.: PCT/JP2015/070923
§ 371 (c)(1),
(2) Date: Jan. 30, 2017

(87) PCT Pub. No.: WO2016/021411
PCT Pub. Date: Feb. 11, 2016

(65) Prior Publication Data
US 2017/0220894 A1    Aug. 3, 2017

(30) Foreign Application Priority Data

Aug. 6, 2014    (JP) ................ 2014-160416

(51) Int. Cl.
*G06K 9/46* (2006.01)
*G06K 9/00* (2006.01)
(Continued)

(52) U.S. Cl.
CPC ....... *G06K 9/4652* (2013.01); *G06K 9/00228* (2013.01); *G06K 9/00771* (2013.01);
(Continued)

(58) Field of Classification Search
USPC ......................................................... 382/103
See application file for complete search history.

(56) References Cited

U.S. PATENT DOCUMENTS 8,213,679 B2 * 7/2012 Yao .................... G06K 9/00785
348/169
8,368,815 B2 * 2/2013 Tsurumi ............ G06K 9/00335
348/699

(Continued)

FOREIGN PATENT DOCUMENTS

| JP | 2005-196590 A | 7/2005 |
| JP | 2013-033317 A | 2/2013 |
| JP | 2014-137688 A | 7/2014 |

*Primary Examiner* — Ishrat I Sherali
(74) *Attorney, Agent, or Firm* — Wolf, Greenfield & Sacks, P.C.

(57) ABSTRACT

An image processing device includes a plurality of object feature amount calculation units to calculate an object feature amount related to an object on an image, from a current frame of a moving image based on different standards, a feature amount selection unit to select an object feature amount to be used from the plurality of object feature amounts, which is calculated based on the different standards, using object attribute information related to an object on a previous frame of the moving image, an object information calculation unit to calculate object information related to an object on the current frame using the selected feature amount and object information related to the object on the previous frame, and an object attribute information calculation unit to calculate object attribute information related to the object on the current frame based on the calculated object information related to the object on the current frame.

6 Claims, 13 Drawing Sheets

(51) Int. Cl.
 *H04N 7/18* (2006.01)
 *G06T 7/246* (2017.01)
 *G06T 7/90* (2017.01)
 *G06T 7/254* (2017.01)

(52) U.S. Cl.
 CPC .............. *G06T 7/246* (2017.01); *G06T 7/254* (2017.01); *G06T 7/90* (2017.01); *H04N 7/18* (2013.01); *G06T 2207/10024* (2013.01); *G06T 2207/30196* (2013.01); *G06T 2207/30236* (2013.01)

(56) References Cited

U.S. PATENT DOCUMENTS

| | | | |
|---|---|---|---|
| 8,488,904 B2 * | 7/2013 | Tsurumi | G06T 7/33 |
| | | | 348/239 |
| 9,202,126 B2 * | 12/2015 | Tojo | G06K 9/3241 |
| 9,275,286 B2 * | 3/2016 | Bulan | G06K 9/6267 |
| 2005/0157929 A1 | 7/2005 | Ogasawara | |
| 2013/0188826 A1 | 7/2013 | Nishino | |
| 2017/0116743 A1 * | 4/2017 | Matsumoto | G06K 9/00805 |

\* cited by examiner

| OBJECT ID | STOPPAGE COUNT VALUE |
|---|---|
| ID:1 | 10 |
| ID:3 | 0 |

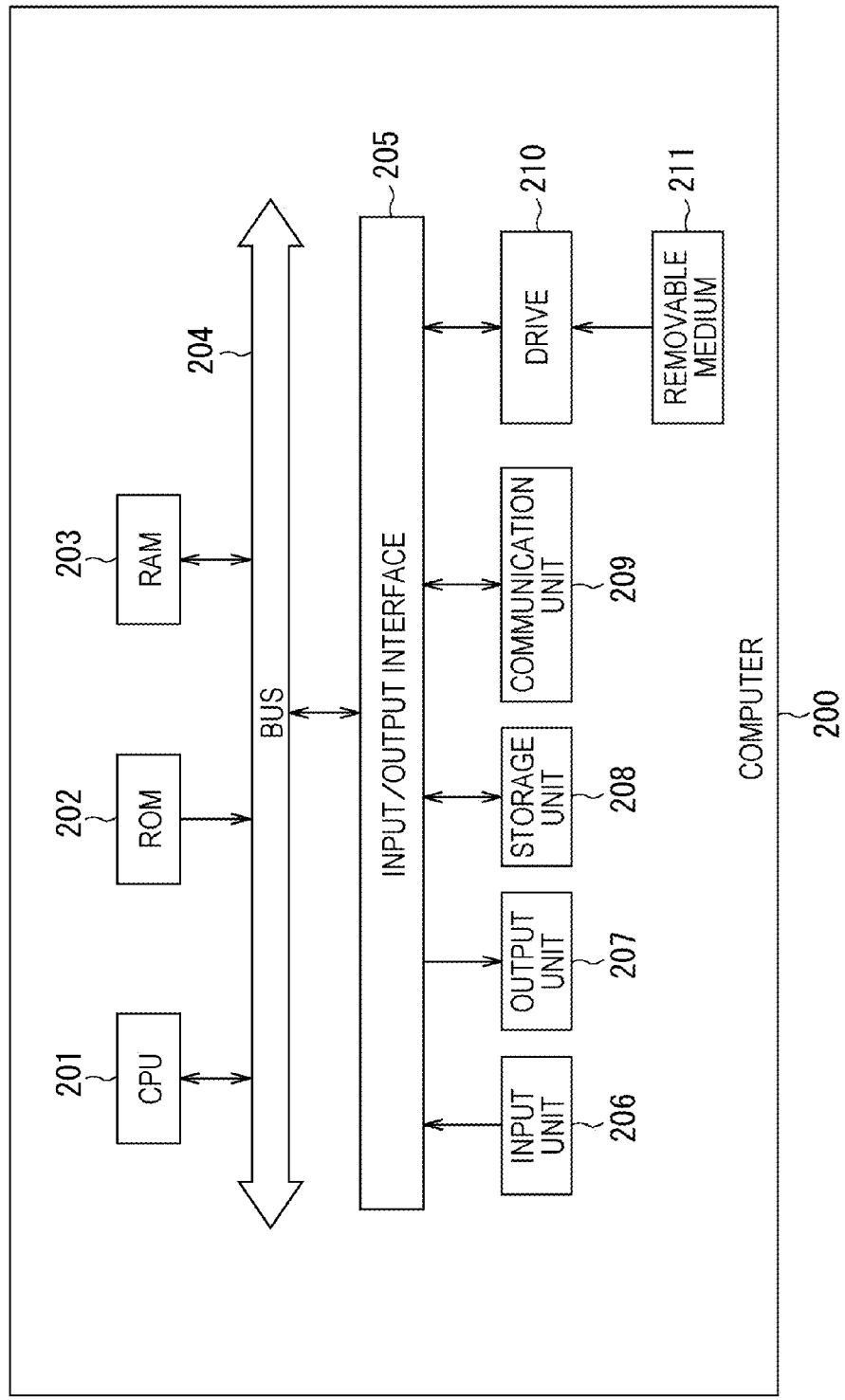

IMAGE PROCESSING DEVICE, IMAGE PROCESSING METHOD, AND PROGRAM

CROSS-REFERENCE TO RELATED APPLICATIONS

This Application is a national stage filing under 35 U.S.C. 371 of International Patent Application Serial No. PCT/JP2015/070923, filed Jul. 23, 2015, titled "IMAGE PROCESSING DEVICE, IMAGE PROCESSING METHOD, AND PROGRAM". Foreign priority benefits are claimed under 35 U.S.C. § 119(a)-(d) or 35 U.S.C. § 365(b) of Japanese application number 2014-160416, filed Aug. 6, 2014.

TECHNICAL FIELD

The present disclosure relates to an image processing device, an image processing method, and a program and specifically relates, for example, to an image processing device, an image processing method, and a program that are suitably used in a case of tracking an object that appears on a moving image.

BACKGROUND ART

Conventionally, there is a technology of detecting an object that appears on a moving image, and it is possible to detect not only an object with a motion (hereinafter, referred to as moving object) but also an object that is still on an image (hereinafter, referred to as motionless object).

For example, in Patent Document 1, a position of an object is detected only by utilization of a difference between a short-term background image, which is generated on the basis of a short-term moving image, and an input image. Then, an invention of calculating, in a case where the moving object stops for a certain period, a position of the still object by using a difference between a long-term background image, which is generated on the basis of a long-term moving image, and an input image is described.

In the invention of Patent Document 1, it is possible to detect a moving object or a motionless object, which is still only for a short period, by using a short-term background image and to separately detect a motionless object, which is still for a long period, by using a long-term background image. However, since a moving object and a motionless object are detected separately, it is not possible to check whether the detected moving object and motionless object are the same object. Thus, for example, in a case where an object with a motion stops on an image and starts moving again after a long period, it is not possible to detect and track these as the same object.

CITATION LIST

Patent Document

Patent Document 1: Japanese Patent Application Laid-Open No. 2013-33317

SUMMARY OF THE INVENTION

Problems to be Solved by the Invention

FIG. 1 is a view for describing the above problem in detail. An object detected on a moving image (the object and motionless object) and an ID assigned thereto are illustrated on the assumption that time passes in a longitudinal direction.

As illustrated in a left-side column in the drawing, in the invention in Patent Document 1, it is possible to detect an automobile, which moves on frames at time t1 and t2, as a moving object and to assign the same ID: 8 thereto. However, when the automobile stops on the frames at time t3 and t4, this is detected as a motionless object and an ID: 100 is assigned thereto.

Moreover, when the stopped automobile starts moving again at time t5 to t6, the automobile is detected again as a moving object and a different ID: 9 is assigned thereto. Moreover, a moving object (ID: 10) may be erroneously detected with respect to a track of the stopped automobile.

As described above, in the conventional technology, even when a moving object and a motionless object detected on a moving image is the same object, it is not possible to process these as the same object. More specifically, it is not possible to assign the same ID in a manner illustrated in a right-side column in the drawing.

The present disclosure is provided in view of such a situation and is to make it possible to continuously track an object on a moving image.

Solutions to Problems

An image processing device that is an aspect of the present disclosure is an image processing device that detects an object on a moving image, the device including: a plurality of object feature amount calculation units configured to calculate an object feature amount, which is related to an object on an image, from a current frame of the moving image on the basis of different standards; a feature amount selection unit configured to select an object feature amount to be used from the plurality of object feature amounts, which is calculated on the basis of the different standards, by using object attribute information related to an object on a previous frame of the moving image; an object information calculation unit configured to calculate object information related to an object on the current frame by using the selected feature amount and object information related to the object on the previous frame; and an object attribute information calculation unit configured to calculate object attribute information related to the object on the current frame on the basis of the calculated object information related to the object on the current frame.

The plurality of object feature amount calculation units includes a first object feature amount calculation unit configured to calculate, as a first object feature amount, a difference in luminance of corresponding pixels in a short-term background image and the current frame, and a second object feature amount calculation unit configured to calculate, as a second object feature amount, a difference in luminance of corresponding pixels in a long-term background image and the current frame. The feature amount selection unit generates a difference image by selecting the first or second feature amount for each pixel by using a stoppage count value as the object attribute information related to the object on the previous frame. The object position calculation unit calculates a positional vector as the object information related to the object on the current frame by using the generated difference image and a positional vector as the object information related to the object on the previous frame. The object attribute information calculation unit can count the stoppage count value as the object attribute information related to the object on the current frame on the basis of the positional vector as the calculated object information related to the object on the current frame.

The object position calculation unit can detect an object candidate on the current frame on the basis of the generated difference image and can make an object candidate on the current frame, a distance from which candidate to the object on the previous frame is the shortest, take over an object ID assigned to the object on the previous frame.

The image processing device that is an aspect of the present disclosure can further include a head detection region setting unit configured to set a head detection region. The plurality of object feature amount calculation units includes a first object feature amount calculation unit configured to calculate, as a first object feature amount, a whole-body region candidate of a person outside a head detection region in the current frame, and a second object feature amount calculation unit configured to calculate, as a second object feature amount, a head region candidate of a person in the head detection region in the current frame. The feature amount selection unit designates a whole-body region and a head region in the previous frame one by one as a focused region, selects the whole-body region candidate or the head region candidate in the current frame according to determination whether a central coordinate of a head in the focused region is in the head detection region, and specifies the selected candidate as a whole-body region or a head region in the current frame. The object position calculation unit calculates a positional vector of the specified whole-body region or head region as the object information related to the object on the current frame by using a positional vector of the focused region as the object information related to the object on the previous frame. The object attribute information calculation unit can calculate a central coordinate of a head in the whole-body region or a central coordinate in the head region as the object attribute information related to the object on the current frame on the basis of the positional vector of the whole-body region or the head region as the calculated object information related to the object on the current frame.

The feature amount selection unit can select a head region candidate in the current frame a distance from which candidate to the focused region is the shortest, make the candidate take over an object ID of the focused region, and specify the candidate as a head region in the current frame in a case where a central coordinate of a head in the focused region is in the head detection region, and can select a whole-body region candidate in the current frame a distance from which candidate to the focused region is the shortest, make the candidate take over an object ID of the focused region, and specify the candidate as a whole-body region in the current frame in a case where a central coordinate of the head in the focused region is not in the head detection region.

An image processing method that is an aspect of the present disclosure is an image processing method of an image processing device that detects an object on a moving image, the method including: an object feature amount calculating step of calculating a plurality of object feature amounts, which is related to an object on an image, from a current frame of the moving image on the basis of different standards; a feature amount selecting step of selecting an object feature amount to be used from the plurality of object feature amounts, which is calculated on the basis of the different standards, by using object attribute information related to an object on a previous frame of the moving image; an object information calculating step of calculating object information related to an object on the current frame by using the selected feature amount and object information related to the object on the previous frame; and an object attribute information calculating step of calculating object attribute information related to the object on the current frame on the basis of the calculated object information related to the object on the current frame, the steps being performed by the image processing device.

A program that is an aspect of the present disclosure causes a computer, which detects an object on a moving image, to function as a plurality of object feature amount calculation units configured to calculate an object feature amount, which is related to an object on an image, from a current frame of the moving image on the basis of different standards, a feature amount selection unit configured to select an object feature amount to be used from the plurality of object feature amounts, which is calculated on the basis of the different standards, by using object attribute information related to an object on a previous frame of the moving image, an object information calculation unit configured to calculate object information related to an object on the current frame by using the selected feature amount and object information related to the object on the previous frame, and an object attribute information calculation unit configured to calculate object attribute information related to the object on the current frame on the basis of the calculated object information related to the object on the current frame.

In an aspect of the present disclosure, a plurality of object feature amounts related to an object on an image is calculated from a current frame of a moving image on the basis of different standards, an object feature amount to be used is selected from the plurality of object feature amounts, which is calculated on the basis of the different standards, by utilization of object attribute information related to an object on a previous frame of the moving image, and object information related to an object on the current frame is calculated by utilization of the selected feature amount and object information related to the object on the previous frame. Moreover, object attribute information related to the object on the current frame is calculated on the basis of the calculated object information related to the object on the current frame.

Effects of the Invention

According to an aspect of the present disclosure, it is possible to continuously track an object on a moving image.

BRIEF DESCRIPTION OF DRAWINGS

FIG. 15 is a block diagram illustrating a configuration example of a computer.

MODE FOR CARRYING OUT THE INVENTION

In the following, the best mode for carrying out the present disclosure (hereinafter, referred to as embodiment) will be described in detail with reference to the drawings.

Figure 1:
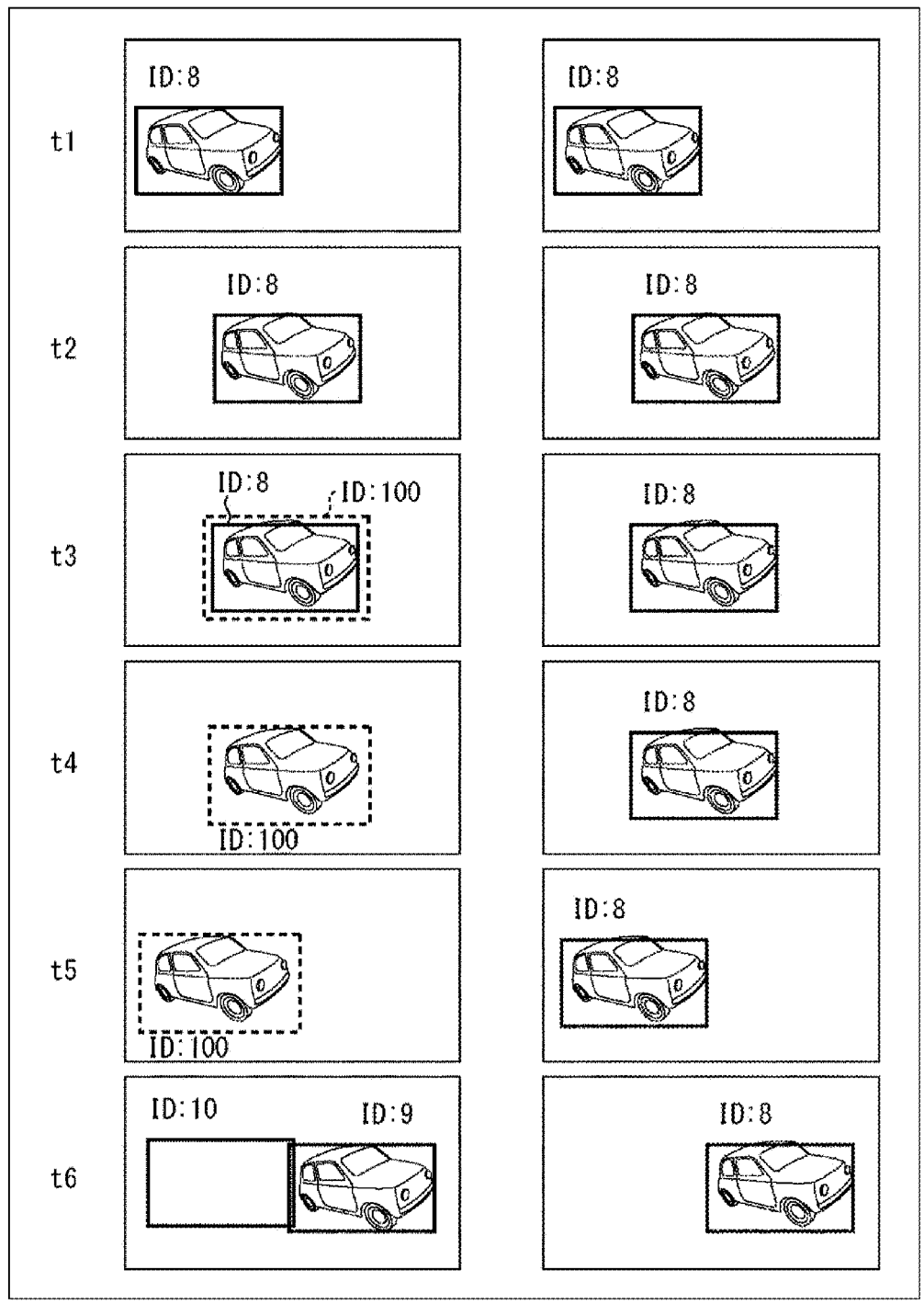
FIG. 1 is a view for describing a problem of a conventional technology.
Figure 2:
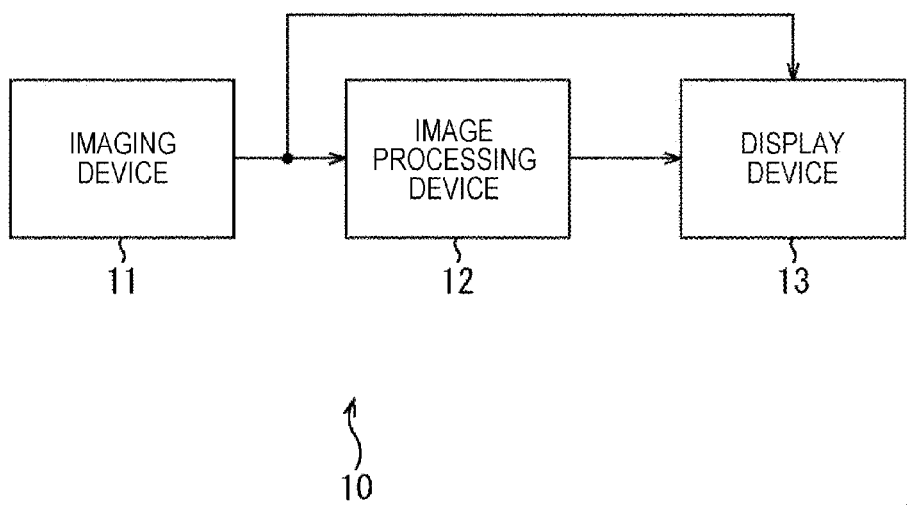
FIG. 2 is a block diagram illustrating a configuration example of a monitoring system to which the present disclosure is applied.

Configuration Example of Monitoring System that is Embodiment of Present Disclosure FIG. 2 is a view illustrating a configuration example of a monitoring system that is an embodiment of the present disclosure.

This monitoring system 10 includes an imaging device 11, an image processing device 12, and a display device 13.

The imaging device 11 continuously images a predetermined imaging range as a moving image and outputs a video signal acquired as a result thereof to the image processing device 12.

With the video signal from the imaging device 11 (hereinafter, referred to as input image) as an input, the image processing device 12 detects an object with a motion and a still object without a motion, which objects appear on the input image, and acquires positional information thereof. Moreover, an object ID is assigned to a detected object. Here, the same object ID is kept assigned to the same object. Moreover, the image processing device 12 outputs an object ID and positional information of a detected object to the display device 13.

The display device 13 displays a frame, which indicates a position of an object detected by the image processing device 12, and an object ID in a superimposed manner on the input image from the imaging device 11.

First Configuration Example of Image Processing Device 12

Figure 3:
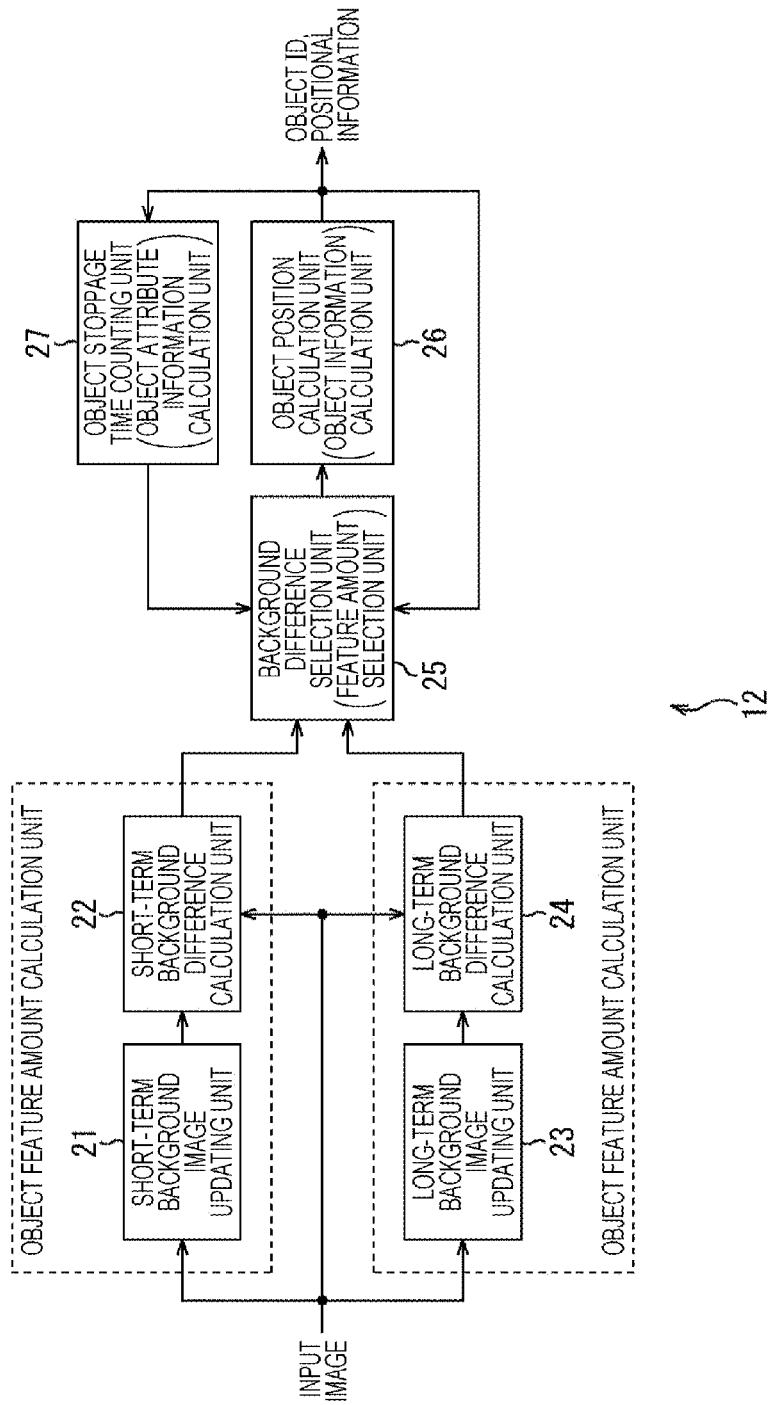
FIG. 3 is a block diagram illustrating a first configuration example of an image processing device.

Next, FIG. 3 is a view illustrating the first configuration example of the image processing device 12. Specifically, the first configuration example of the image processing device 12 is what makes it possible to continuously and mutually track a moving object and a motionless object on a moving image.

The first configuration example of the image processing device 12 includes a short-term background image updating unit 21, a short-term background difference calculation unit 22, a long-term background image updating unit 23, a long-term background difference calculation unit 24, a background difference selection unit 25, an object position calculation unit 26, and an object stoppage time counting unit 27.

The short-term background image updating unit 21 holds a short-term background image, which immediately follows an input image, and updates the held short-term background image and outputs the updated short-term background image to the short-term background difference calculation unit 22 each time a current frame of the input image is input from the imaging device 11 in a previous stage. Note that updating of a short-term background image is performed with respect to each pixel at the same coordinate according to the following expression (1), for example.

$$I_{t+1} = \alpha_s \times I_t + (1-\alpha_s) \times I_c \quad (1)$$

Note that $I_{t+1}$ is a luminance value of a pixel in an updated short-term background image, $I_t$ is a luminance value of a pixel in a pre-update short-term background image, $I_c$ is a luminance value of a pixel in an input image, and $\alpha_s$ is a short-term update coefficient equal to or larger than 0 and smaller than 1.

The short-term background difference calculation unit 22 calculates a difference between luminance values of corresponding pixels in a current frame of an input image and a short-term background image and outputs a result thereof as a short-term difference to the background difference selection unit 25.

The long-term background image updating unit 23 holds a long-term background image, which slowly follows an input image, and updates the held long-term background image and outputs the updated long-term background image to the long-term background difference calculation unit 24 each time a current frame of the input image is input from the imaging device 11 in the previous stage. Note that updating of a long-term background image is performed with respect to each pixel at the same coordinate according to the following expression (2), for example.

$$I_{t+1} = \alpha_1 \times I_t + (1-\alpha_1) \times I_c \quad (2)$$

Note that $I_{t+1}$ is a luminance value of a pixel in an updated short-term background image, $I_t$ is a luminance value of a pixel in a pre-update short-term background image, $I_c$ is a luminance value of a pixel in an input image, and $\alpha_1$ is a long-term update coefficient that is larger than $\alpha_s$ and that is equal to or larger than 0 and smaller than 1.

The long-term background difference calculation unit 24 calculates a difference between luminance values of corresponding pixels in a current frame of an input image and a long-term background image and outputs a result thereof as a long-term difference to the background difference selection unit 25.

Note that generation and updating of a short-term background image and a long-term background image are not limited to the above-described methods of using the expressions (1) and (2). For example, a background model using Gaussian mixture distribution (C. Stauffer and W. E. L. Grimson, "Adaptive background mixture models for real-time tracking," Proc. IEEE CVPR 1999, pp. 24&252, June 1999.) may be used or kernel density estimation (A. Elgammal, D. Hanvood, and L. S. Davis, "Nonparametric model for background subtraction," Proc. ECCV 2000, pp. 751-767, June 2000.) may be used.

By selecting, for each pixel, one of a short-term difference input from the short-term background difference calculation unit 22 and a long-term difference input from the long-term background difference calculation unit 24, the background difference selection unit 25 generates a difference image and outputs the image to the object position calculation unit 26. More specifically, a long-term difference is selected with respect to a pixel that belongs to an object region with a stoppage count value (described later) being equal to or larger than a predetermined long/short selection threshold (region of object that is still for long period) among object regions specified in a previous frame and a short-term difference is selected with respect to the other pixel, whereby a difference image is generated.

Note that instead of calculation of both of a short-term difference and a long-term difference and selection of one thereof with respect to all pixels in an input image, a long-term difference may be calculated with respect only to a pixel that belongs to an object region with a stoppage count value being equal to or larger than a predetermined long/short selection threshold among object regions specified in a previous frame and only a short-term difference may be calculated with respect to the other pixel.

The object position calculation unit 26 focuses on a pixel value (long-term difference or short-term difference) of a pixel in a difference image input from the background difference selection unit 25 and extracts a pixel with the value being equal to or larger than a predetermined difference threshold. In a case where adjoining pixels are extracted, an object region candidate is generated by grouping of these and a new object ID is assigned with respect to each object region candidate.

Also, the object position calculation unit 26 specifies, for each object region specified in a previous frame, what has the shortest distance among object region candidates in a current frame. In a case where the distance is equal to or shorter than a predetermined distance threshold, the object region candidate is made to take over an object ID of an object region in the frame. Moreover, a position of an object region in a current frame is calculated on the basis of positions of an object region in a previous frame and an object region candidate in the current frame. More specifically, the position of the object region in the current frame is calculated according to the following expression (3).

$$x_{t+1} = \beta \times x_t + (1-\beta) \times x_0 \qquad (3)$$

Note that $x_{t+1}$ is a positional vector of an object region specified in a current frame, $x_t$ is a positional vector of an object region specified in a previous frame, $I_c$ is a positional vector of an object region candidate in the current frame, and $\beta$ is an update coefficient.

Note that calculation of a position of an object region in a current frame is not limited to the above-described method of using the expression (3). For example, a different method such as the Kalman filter (R. E. Kalman, "A New Approach to Linear Filtering and Prediction Problems," J. Fluids Eng. 82(1), 35-45 (Mar. 1, 1960)) may be used.

Moreover, the object position calculation unit 26 specifies an object region candidate in a current frame, which candidate does not take over an object ID of an object region specified in a previous frame, as it is as an object region and outputs positional information and object IDs of all object regions to the display device 13, the background difference selection unit 25, and the object stoppage time counting unit 27 in the following stage.

The object stoppage time counting unit 27 holds a count table in which a stoppage count value is associated to an object ID of a specified object region. Then, the object stoppage time counting unit 27 determines whether a difference between positions of an object region specified in a previous frame and an object region that takes over an object ID thereof and that is specified in a current frame is equal to or smaller than a predetermined stoppage determination threshold. In a case where it is determined that the difference between the positions of the two is equal to or smaller than the stoppage determination threshold, the object stoppage time counting unit 27 counts up a stoppage count value, which is associated to the object ID of the object region in the count table, for one on the assumption that the object region is still. Inversely, in a case where it is determined that the difference between the positions of the two is larger than the stoppage determination threshold, the object stoppage time counting unit 27 resets a stoppage count value, which is associated to the object ID of the object region in the count table, to zero on the assumption that the object region moves.

Figures 4, 5:
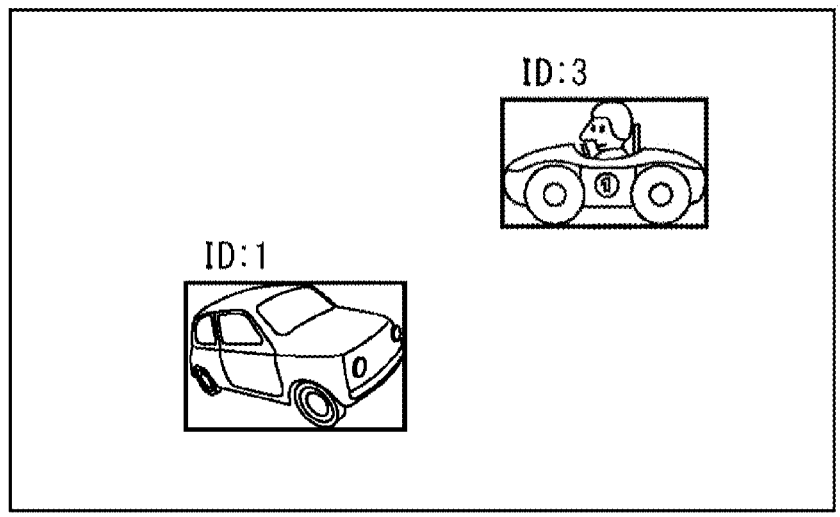
FIG. 4 is a view illustrating an example of an object region specified on a current frame.
FIG. 5 is view illustrating an example of a count table, the example corresponding to FIG. 4.
Figure 6:
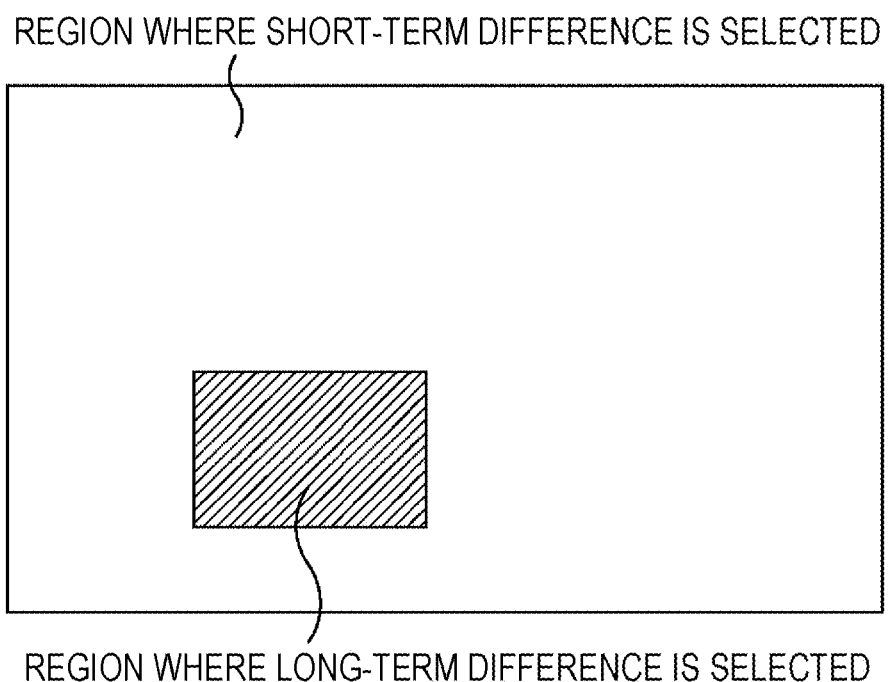
FIG. 6 is a view illustrating an example of a region where a long-term difference is selected, the example corresponding to FIG. 4.

FIG. 4 is a view illustrating an example of a case where an object region is specified on a current frame. In a case of the drawing, an automobile on a lower left side of a screen and an automobile on an upper right side thereof are detected as object regions, ID: 1 and ID: 3 being respectively assigned thereto as object IDs.

FIG. 5 is a view illustrating an example of a counter table, the example corresponding to FIG. 4. In the drawing, a stoppage count value of an object region with an object ID: 1 is 10 and a stoppage count value of an object region with an object ID: 3 is 0. This means that 10 frames pass after the object region with the object ID: 1 stops and that the object region with the object ID: 3 is moving. Here, for example, when it is assumed that a long/short selection threshold is 5, in generation of a difference image of a next frame, a long-term difference is selected with respect to the object region with the object ID: 1 in which region a stoppage count value is larger than the long/short selection threshold=5 and a short-term difference is selected with respect to the other region.

Object Detection Processing by First Configuration Example of Image Processing Device 12

Figure 7:
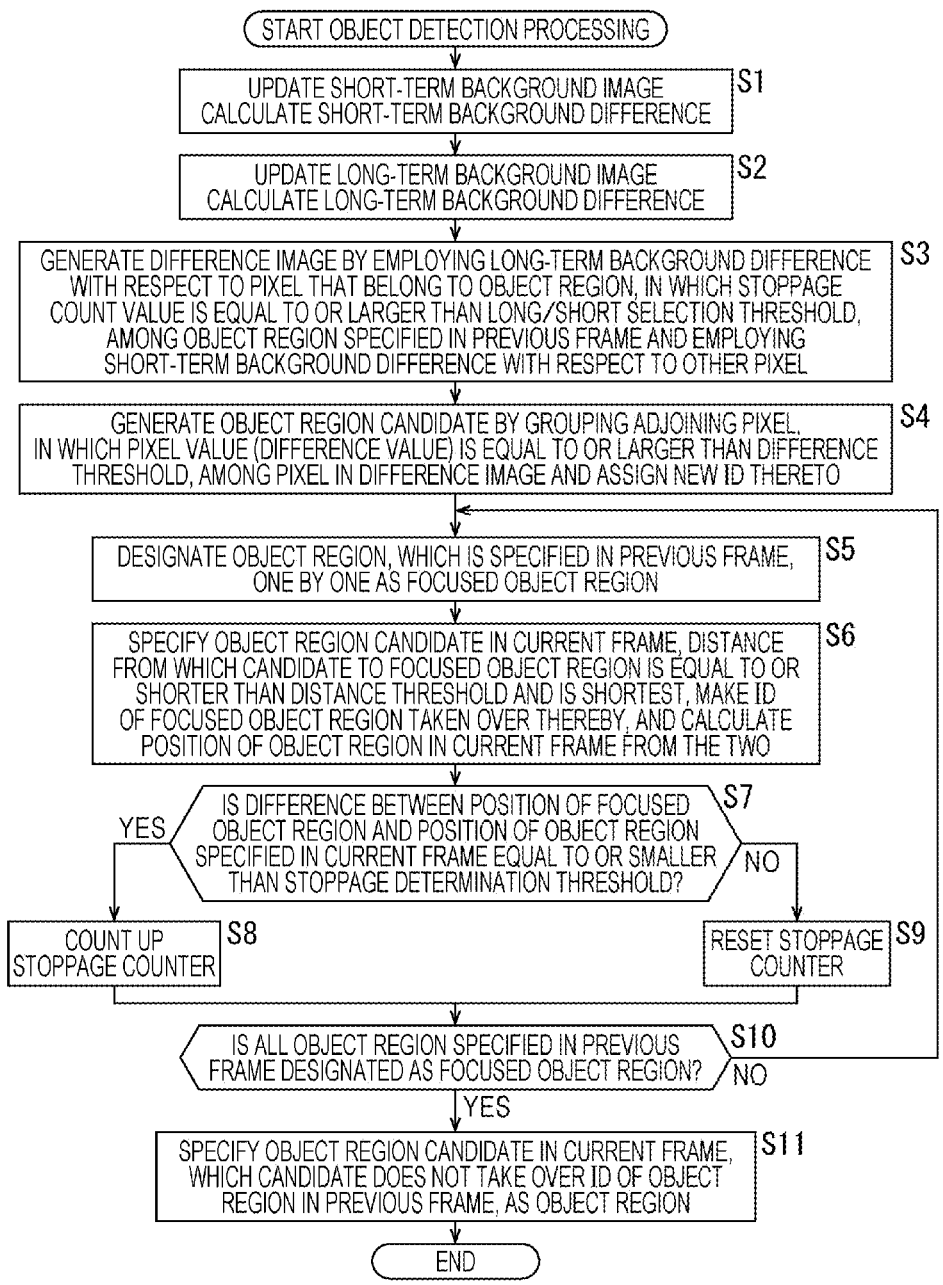
FIG. 7 is a flowchart for describing object detection processing by the first configuration example of the image processing device.

Next, FIG. 7 is a flowchart for describing the object detection processing by the first configuration example of the image processing device 12.

This object detection processing is executed with respect to each frame of an input image input from the imaging device 11 into the image processing device 12.

In step S1, the short-term background image updating unit 21 updates a held short-term background image on the basis of a current frame of an input image and outputs the updated short-term background image to the short-term background difference calculation unit 22. The short-term background difference calculation unit 22 calculates a difference between luminance values of corresponding pixels in the current frame of the input image and the short-term background image and outputs a result thereof as a short-term difference to the background difference selection unit 25.

In step S2, the long-term background image updating unit 23 updates a held long-term background image on the basis of the current frame of the input image and outputs the updated long-term background image to the long-term background difference calculation unit 24. The long-term background difference calculation unit 24 calculates a difference between luminance values of corresponding pixels in the current frame of the input image and the long-term background image and outputs a result thereof as a long-term difference to the background difference selection unit 25.

Note that the above-described processing in step S1 and processing in step S2 can be executed in parallel.

In step S3, the background difference selection unit 25 generates a difference image by selecting a long-term difference with respect to a pixel that belongs to an object region with a stoppage count value being equal to or larger than a predetermined long/short selection threshold among object regions specified in a previous frame and by selecting a short-term difference with respect to the other pixel.

In step S4, the object position calculation unit 26 focuses on a pixel value of a pixel in a difference image input from the background difference selection unit 25 and extracts a pixel with the value being equal to or larger than a predetermined difference threshold. In a case where adjoining pixels are extracted, an object region candidate is generated by grouping of these and a new object ID is assigned with respect to each object region candidate.

In step S5, the object position calculation unit 26 designates the object regions, which are specified in the previous frame, one by one as a focused object region. In step S6, the object position calculation unit 26 specifies an object region candidate in the current frame, a distance from which candidate to a focused object region is equal to or shorter than a predetermined distance threshold and is the shortest, and makes the specified object region candidate take over an object ID of the focused object region in the frame. Moreover, the object position calculation unit 26 calculates a position of an object region in the current frame on the basis of positions of the focused object region in the previous frame and the object region candidate in the current frame, and specifies a result of the calculation as the object region in the current frame. Moreover, the object position calculation unit 26 outputs positional information and an object ID of the specified object region in the current frame to the display device 13, the background difference selection unit 25, and the object stoppage time counting unit 27 in the following stage.

In step S7, the object stoppage time counting unit 27 determines whether a difference between positions of an object region specified in the previous frame and an object region specified in the current frame which region takes over an object ID thereof is equal to or smaller than a predetermined stoppage determination threshold. In a case where a result of the determination is positive (YES), the processing goes to step S8 and a stoppage count value associated to the object ID of the object region in the count table is counted up for one on the assumption that the object region is still. Inversely, in a case where a result of the determination is negative (NO), the processing goes to step S9 and a stoppage count value associated to the object ID of the object region in the count table is reset to zero on the assumption that the object region moves.

In step S10, the object position calculation unit 26 determines whether all object regions specified in the previous frame are designated as focused object regions. In a case where a result of this determination is negative, there is still what is not yet designated as a focused object region, the processing goes back to step S5 and the processing in and after that is repeated. Then, in a case where a result of the determination in step S10 becomes positive (YES), the processing goes to step S11.

In step S11, the object position calculation unit 26 specifies an object region candidate in the current frame, which candidate does not take over an object ID of an object region specified in the previous frame, as it is as an object region and outputs positional information and an object ID thereof to the display device 13, the background difference selection unit 25, and the object stoppage time counting unit 27 in the following stage. From the above, the object detection processing is over.

By executing the above-described object detection processing for each frame, it is possible to track an object, which continuously appears on a moving image, while assigning the same object ID thereto regardless of a motion or stoppage thereof. Also, it is possible to assign a new object ID to an object that newly appears.

Thus, it becomes possible to specify a path of an object including an object that is still for a long term. In a detail application example of the monitoring system 10, it becomes possible to follow a subject that is still for a long period. For example, it is possible to find a person who stops or hovers around for a long period as a suspicious person or to measure a traffic flow correctly even in a case where an automobile stops for a long time due to a traffic jam or the like.

Second Configuration Example of Image Processing Device 12

Next, the second configuration example of the image processing device 12 will be described. The second configuration example of the image processing device 12 is what makes it possible to continuously track an object even in a case where a state in which a whole object can be seen on a moving image becomes a state in which only a part thereof can be seen.

Figure 8:
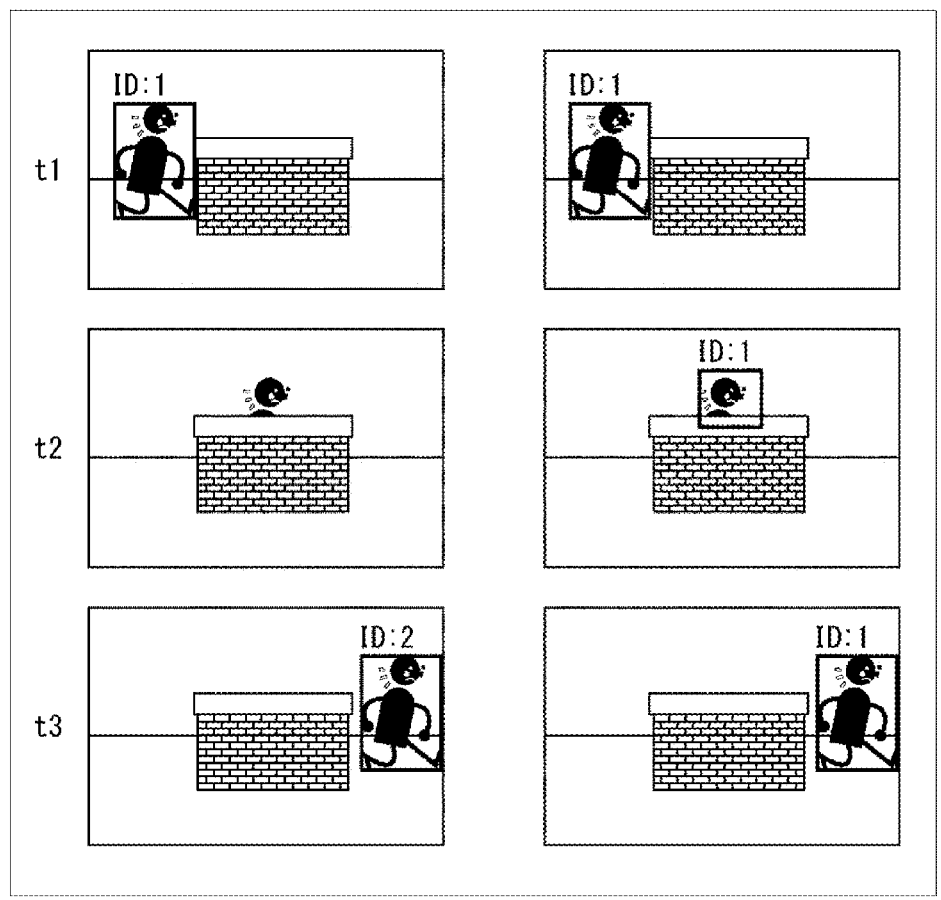
FIG. 8 is a view for describing an operation summary according to a second configuration example of an image processing device.

FIG. 8 is a view for describing an operation summary of the second configuration example of the image processing device 12 with a case of detecting a whole body of a person as an example.

Conventionally, in a case where a whole body of a person is an object of detection, a whole body of a person is detected and an ID: 1 is assigned thereto in a frame at time t1 as illustrated in a left-side column in the drawing. However, as illustrated in a frame at time t2, in a case where only a part of a whole body (head in case of the drawing), nothing is detected since a whole body is the object of detection. Then, in a frame at time t3, an ID: 2 is newly assigned although the whole body of the person is detected.

On the other hand, the second configuration example of the image processing device 12 assigns an ID that is the same with an ID assigned to a whole body in the frame at the time t2 even in a case where only a part of the whole body (head in case of the drawing) is seen as illustrated in the frame at the time t2, and assigns an ID that is the same with the ID assigned to the head in the frame at the time t2 in a case where the whole body is seen again as illustrated in the frame at the time t3.

Figure 9:
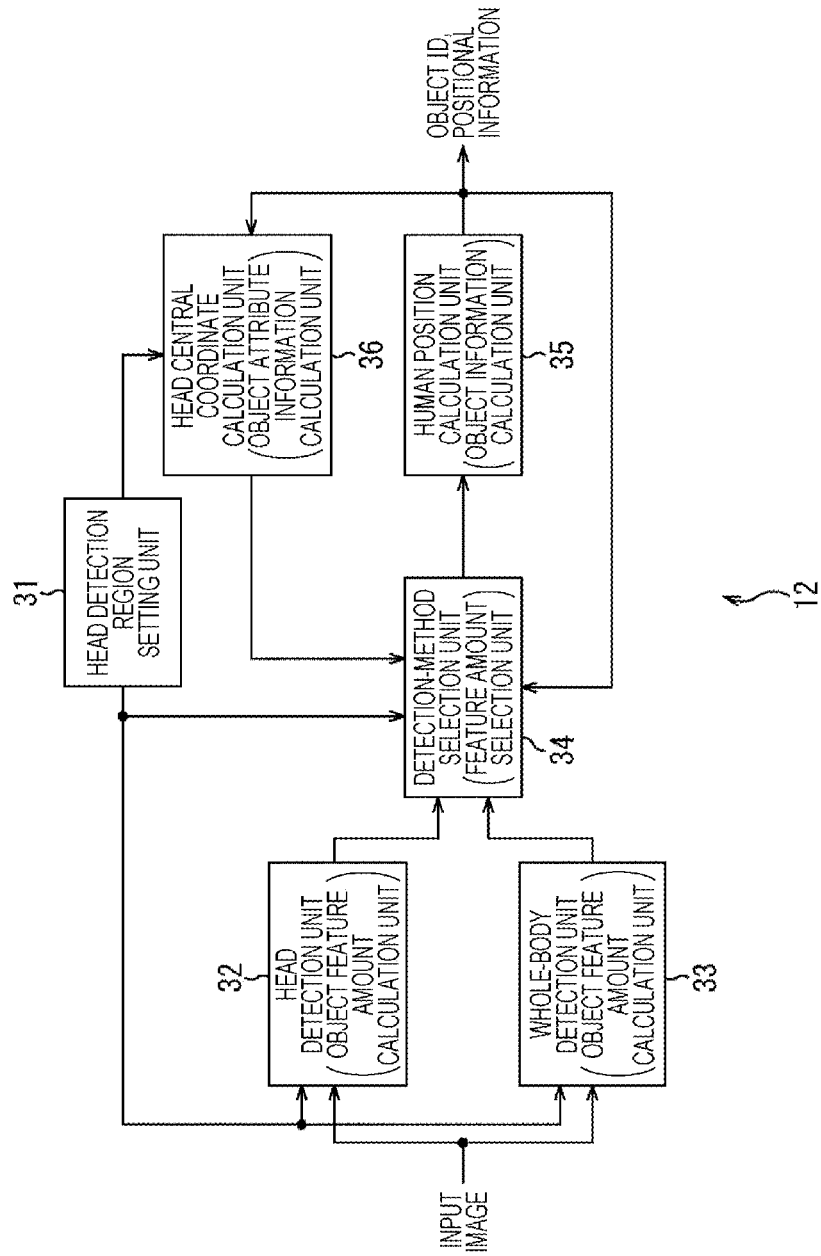
FIG. 9 is a block diagram illustrating the second configuration example of the image processing device.

FIG. 9 is a view illustrating the second configuration example of the image processing device 12. The second configuration example of the image processing device 12 includes a head detection region setting unit 31, a head detection unit 32, a whole-body detection unit 33, a detection-method selection unit 34, a human position detection unit 35, and a head central coordinate calculation unit 36.

Figure 10:
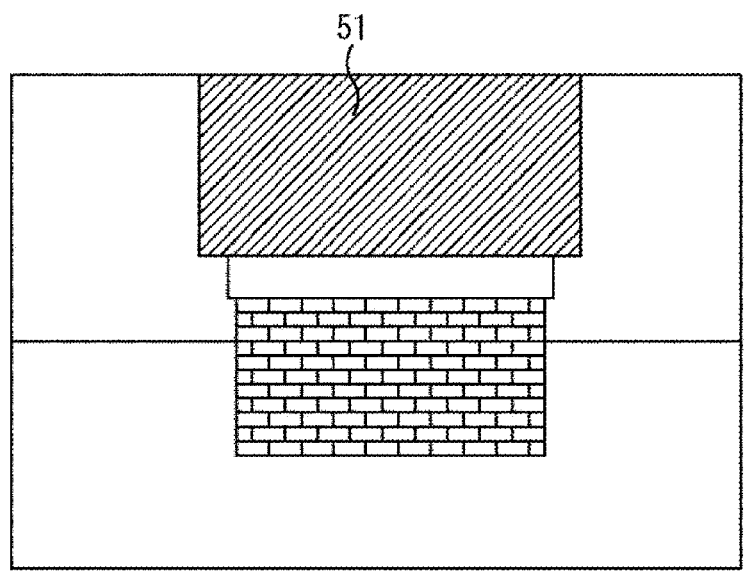
FIG. 10 is a view for describing setting of a head detection region.

When there is a masking object in an imaging range as illustrated in FIG. 10, the head detection region setting unit 31 sets a region, in which a part of a whole body of a person may be masked by the masking object and only a head may be seen, as a head detection region 51 on the basis of operation by an operator and gives notification to the head detection unit 32, the whole-body detection unit 33, the detection-method selection unit 34, and the head central coordinate calculation unit 36.

Each time a current frame of an input image is input from the imaging device 11 in the previous stage, the head detection unit 32 detects a head of a person in a head detection region 51 therein, assigns a new object ID to a result of the detection, and outputs the result as a head region candidate to the detection-method selection unit 34. Each time a current frame of an input image is input from the imaging device 11 in the previous stage, the whole-body detection unit 33 detects a whole body of a person outside a head detection region 51 therein, assigns a new object ID to a result of the detection, and outputs the result as a whole-body region candidate to the detection-method selection unit 34.

Note that in detection of a head in the head detection unit 32 or detection of a whole body in the whole-body detection unit 33, for example, an arbitrary existing method such as a method of using machine learning described in (Navneet Dalal and Bill Triggs, "Histograms of Oriented Gradients for Human Detection," "International Conference on Computer Vision & Pattern Recognition (CVPR '05) 1 (2005) 886-893") or the like can be employed.

The detection-method selection unit 34 designates a head region and a whole-body region, which are specified in a previous frame, one by one as a focused region. In a case where a central coordinate of a head in a focused region is in the head detection region 51, a head region candidate in the current frame a distance from which candidate to the central coordinate of the head in the focused region is equal to or shorter than a predetermined distance threshold and is the shortest is specified and an object ID of the focused region is taken over by the head region candidate.

Also, in a case where a central coordinate of a head in a focused region is not in the head detection region 51, the detection-method selection unit 34 specifies a whole-body region candidate in the current frame a distance from which candidate to the central coordinate of the head in the focused region is equal to or shorter than a predetermined distance threshold and is the shortest and makes the whole-body region candidate take over an object ID of the focused region.

Note that the head detection unit 32 and the whole-body detection unit 33 may respectively detect a head region candidate and a whole-body region candidate from a whole region of an input image and the detection-method selection unit 34 may employ only a head region candidate detected in the head detection region 51 and may employ only a whole-body region candidate detected outside the head detection region 51.

The human position calculation unit 35 calculates a position of a head region (or whole-body region candidate) in a current frame on the basis of positions of a focused region in a previous frame and a head region candidate (or whole-body region candidate) in the current frame, which candidate takes over an object ID thereof, and specifies a result of the calculation as the head region (or whole-body region candidate) in the current frame. Note that the above-described expression (3) may be used in calculation of a position of the head region (or whole-body region candidate).

Also, the human position calculation unit 35 outputs positional information and object IDs of the specified head region and whole-body region in the current frame to the display device 13, the detection-method selection unit 34, and the head central coordinate calculation unit 36 in the following stage.

The head central coordinate calculation unit 36 calculates a central coordinate of a head in each of the whole-body region and the head region, which are specified in the current frame, for utilization in processing with respect to a next frame and outputs a result of the calculation to the detection-method selection unit 34.

Figure 11:
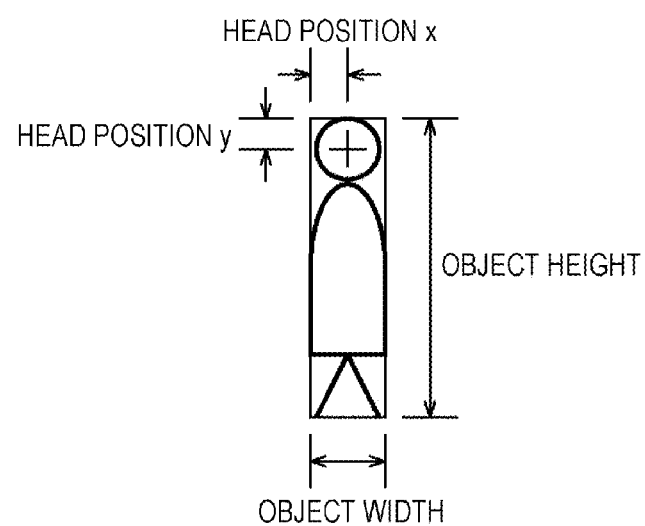
FIG. 11 is a view for describing a method of calculating a central coordinate of a head in a whole-body region.

FIG. 11 is a view for describing a method of calculating a central coordinate of a head in a whole-body region. In a case of calculating a central coordinate of a head in a whole-body region, a central coordinate (x, y) of the head is calculated from a size of a circumscribed rectangle of the specified whole-body region according to the following expression (4).

$$x = \text{object width}/2$$

$$y = \text{object height} \times \text{average face size/average height}/2 \quad (4)$$

Note that an average value in an area where this monitoring system 10 is used, that is, that of a race or the like that may become a subject is previously set with respect to each of an average face size and an average height.

Figure 12:
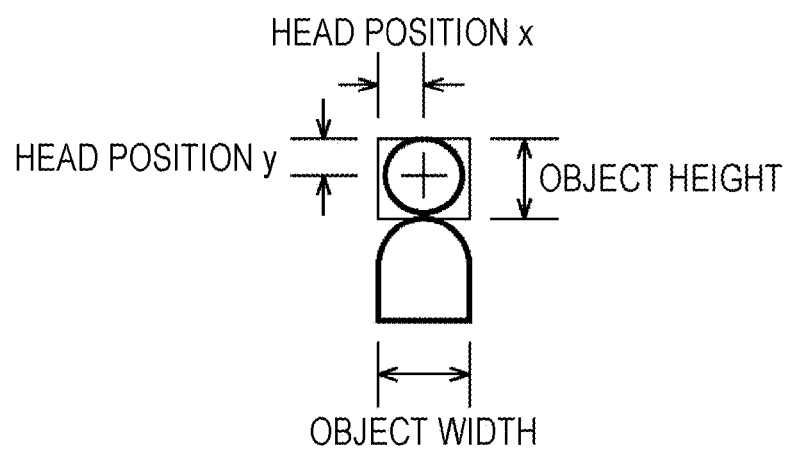
FIG. 12 is a view for describing a method of calculating a central coordinate in a head region.

FIG. 12 is a view for describing a method of calculating a central coordinate in a head head region. In this case of calculating a central coordinate in a head region, a central coordinate (x, y) of a head is calculated from a size of a circumscribed rectangle of the specified head region according to the following expression (5).

$$x = \text{object width}/2$$

$$y = \text{object height}/2 \quad (5)$$

Object Detection Processing by Second Configuration Example of Image Processing Device 12

Figure 13:
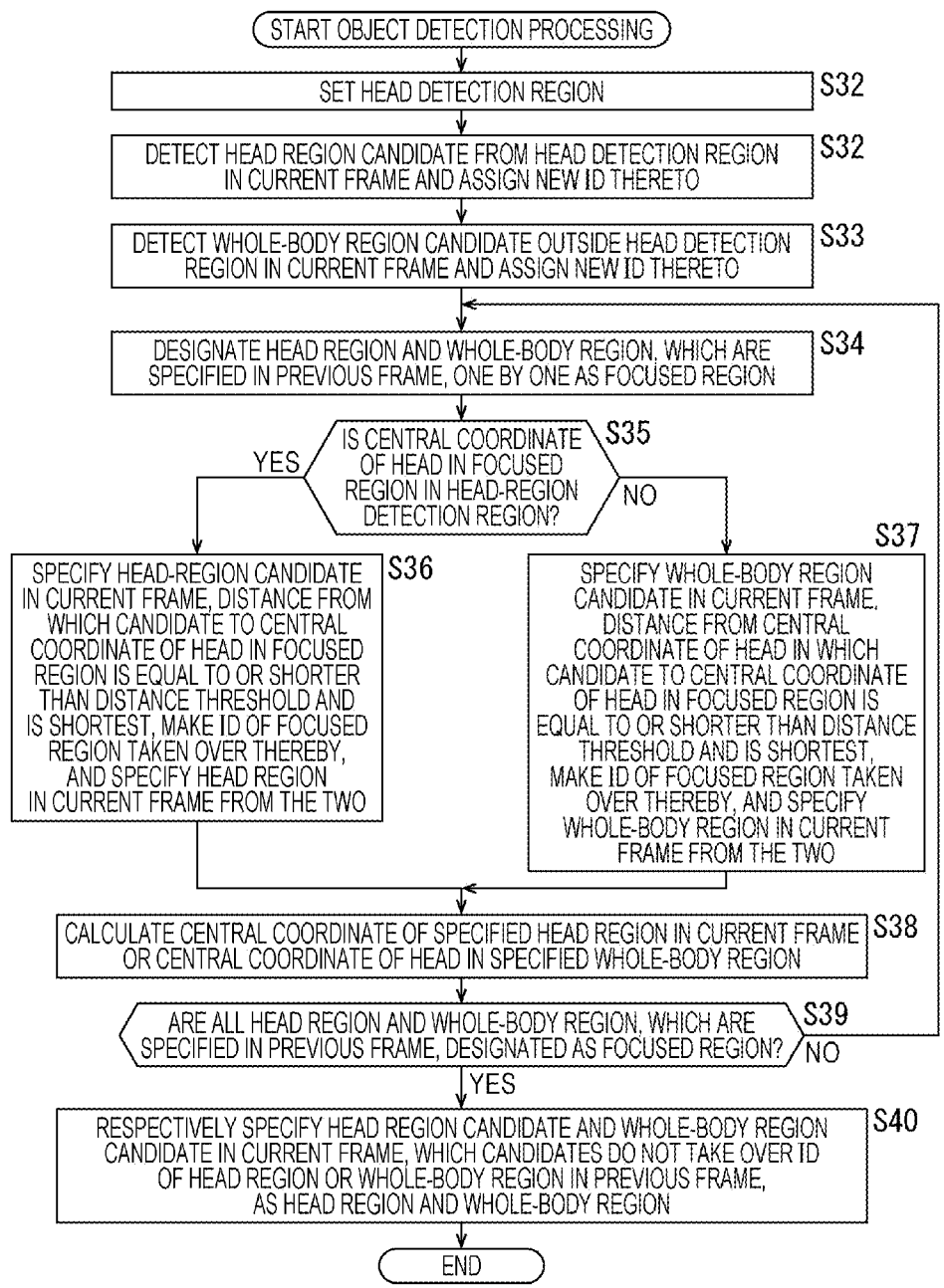
FIG. 13 is a flowchart for describing object detection processing by the second configuration example of the image processing device.

Next, FIG. 13 is a flowchart for describing the object detection processing by the second configuration example of the image processing device 12.

This object detection processing is executed with respect to each frame of an input image input from the imaging device 11 into the image processing device 12.

In step S31, the head detection region setting unit 31 sets a head detection region 51 on the basis of operation by an operator and gives notification to the head detection unit 32, the whole-body detection unit 33, the detection-method selection unit 34, and the head central coordinate calculation unit 36.

In step S32, the head detection unit 32 detects a head of a person in a head detection region 51 in a current frame of an input image, assigns a new object ID to a result of the detection, and outputs the result as a head region candidate to the detection-method selection unit 34. In step S33, the whole-body detection unit 33 detects a whole body of a person outside the head detection region 51 in the current frame of the input image, assigns a new object ID to a result of the detection, and outputs the result as a whole-body region candidate to the detection-method selection unit 34.

Note that the above-described processing in step S32 and processing in step S33 can be executed in parallel.

In step S34, the detection-method selection unit 34 designates a head region and a whole-body region, which are specified in a previous frame, one by one as a focused region. In step S35, the detection-method selection unit 34 determines whether a central coordinate of a head in a focused region is in the head detection region 51. In a case where a result of this determination is positive (YES), the processing goes to step S36. Inversely, in a case where a result of the determination is negative (NO), the processing goes to step S37.

Figure 14:
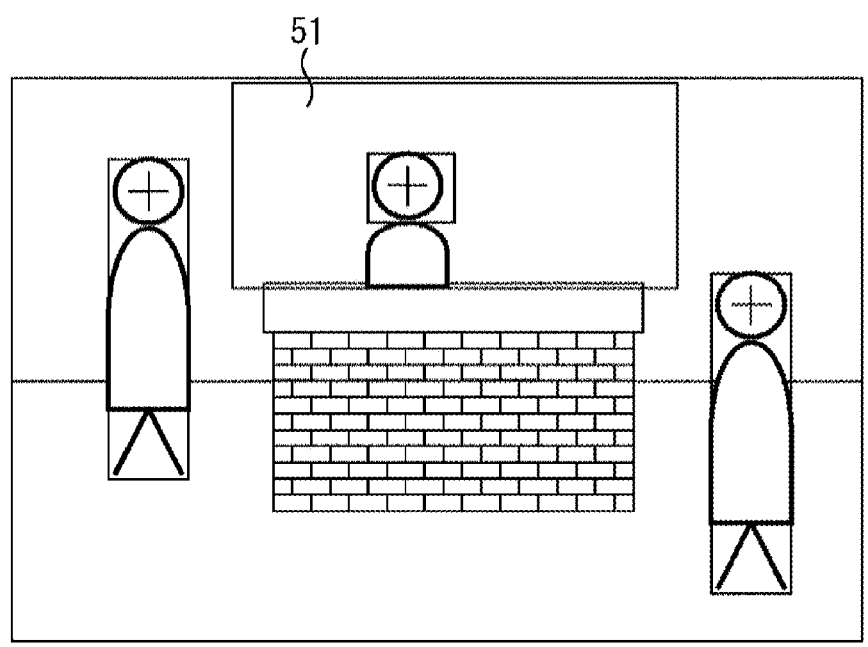
FIG. 14 is a view illustrating an example of a detection result.

For example, as illustrated in FIG. 14, in a case where two whole-body regions and one head region are specified in a previous frame and the head region in the head detection region 51 is designated as a focused region, the processing goes to step S36. Also, in a case where one of the two whole-body regions is designated as a focused region, the processing goes to step S37.

In step S36, the detection-method selection unit 34 specifies a head region candidate, which is detected in the current frame and a distance from which to a central coordinate of a head in a focused region is equal to or shorter than a predetermined distance threshold and is the shortest, and makes the head region candidate take over an object ID of the focused region. The human position calculation unit 35 calculates a position of a head region in the current frame on the basis of positions of a focused region in the previous frame and a head region candidate in the current frame, which candidate takes over an object ID thereof, and specifies a result of the calculation as the head region in the current frame. Then, the human position calculation unit 35 outputs positional information and an object ID of the specified head region in the current frame to the display device 13, the detection-method selection unit 34, and the head central coordinate calculation unit 36 in the following stage.

On the other hand, in step S37, the detection-method selection unit 34 specifies a whole-body region candidate, which is detected in the current frame and a distance from which to a central coordinate of a head in a focused region is equal to or shorter than a predetermined distance threshold and is the shortest, and makes the whole-body region candidate take over an object ID of the focused region. The human position calculation unit 35 calculates a position of a whole-body region in the current frame on the basis of positions of the focused region in the previous frame and the whole-body region candidate in the current frame, which candidate takes over an object ID thereof, and specifies a result of the calculation as the whole-body region in the current frame. Then, the human position calculation unit 35 outputs positional information and an object ID of the specified whole-body region in the current frame to the display device 13, the detection-method selection unit 34, and the head central coordinate calculation unit 36 in the following stage.

In step S38, the head central coordinate calculation unit 36 calculates a central coordinate of a head in the head region or whole-body region specified in the current frame and outputs a result of the calculation to the detection-method selection unit 34.

In step S39, the detection-method selection unit 34 determines whether all head regions and whole-body regions specified in the previous frame are designated as focused regions. In a case where a result of this determination is negative, there is still what is not yet designated as a focused region, the processing goes back to step S34 and the processing in and after that is repeated. Then, in a case where a result of the determination in step S39 is positive, the processing goes to step S40.

In step S40, the human position calculation unit 35 specifies a head region candidate or a whole-body region candidate in the current frame, which candidate does not take over an object ID of a head region or a whole-body region specified in the previous frame, as it is as a head region or a whole-body region and outputs positional information and an object ID thereof to the display device 13, the background difference selection unit 25, and the object stoppage time counting unit 27 in the following stage. From the above, the object detection processing is over.

By executing the above-described object detection processing for each frame, it is possible to track an object, which continuously appears on a moving image, while assigning the same object ID thereto even when a part thereof is masked. Also, it is possible to assign a new object ID to an object that newly appears.

In a detail application example of the monitoring system 10, it becomes possible to analyze a movement line of a worker for consideration of improving operation efficiency in a factory or to record a behavior of a customer and to use the information for marketing.

Note that in the second configuration example of the image processing device 12, a case where only a head of a whole body can be seen has been described. However, for example, when a feature amount related to a part of a body other than a head (such as feature amount of face or feature amount related to unique mark of uniform of athlete or the like/workwear) is learned, it becomes also possible to detect and track that.

Incidentally, the above-described series of processing by the image processing device 12 can be executed by hardware or by software. In a case where the series of processing is executed by software, a program included in the software is installed into a computer. Here, the computer includes a computer embedded in special hardware or a general personal computer that can execute various functions by installation of various programs, for example.

FIG. 15 is a block diagram illustrating a configuration example of hardware of a computer that executes the above-described series of processing by a program.

In a computer 200, a central processing unit (CPU) 201, a read only memory (ROM) 202, and a random access memory (RAM) 203 are connected to each other by a bus 204.

To the bus 204, an input/output interface 205 is further connected. To the input/output interface 205, an input unit 206, an output unit 207, a storage unit 208, a communication unit 209, and a drive 210 are connected.

The input unit 206 includes a keyboard, a mouse, a microphone, or the like. The output unit 207 includes a display, a speaker, or the like. The storage unit 208 includes a hard disk, a nonvolatile memory, or the like. The communication unit 209 includes a network interface or the like. The drive 210 drives a removable medium 211 such as a magnetic disk, an optical disk, a magneto optical disk, or a semiconductor memory.

In the computer configured in the above manner, the CPU 201 loads, for example, a program stored in the storage unit 208 into the RAM 203 through the input/output interface 205 and the bus 204 and executes the program, whereby the above-described series of processing is performed.

Note that a program executed by the computer 200 may be a program in which processing is performed in time series in order described in the present description or may be a program in which processing is performed in parallel or at necessary timing such as at performance of a call.

Note that an embodiment of the present disclosure is not limited to the above-described embodiment and various modifications can be made within the spirit and the scope of the present disclosure.

REFERENCE SIGNS LIST

11 Imaging device
12 Image processing device
13 Display device
21 Short-term background image updating unit
22 Short-term background difference calculation unit
23 Long-term background image updating unit
24 Long-term background difference calculation unit
25 Background difference selection unit
26 Object position calculation unit
27 Object stoppage time counting unit
31 Head detection region setting unit
32 Head detection unit
33 Whole-body detection unit
34 Detection-method selection unit
35 Human position calculation unit
36 Head central coordinate calculation unit
51 Head detection region
200 Computer
201 CPU

The invention claimed is:

1. An image processing device that detects an object on a moving image, the device comprising:
a plurality of object feature amount calculation units configured to calculate a plurality of object feature amounts, which is related to an object on an image, from a current frame of the moving image on the basis of different standards;
a feature amount selection unit configured to select an object feature amount to be used from the plurality of object feature amounts, which is calculated on the basis of the different standards, by using object attribute information related to an object on a previous frame of the moving image;
an object information calculation unit configured to calculate object information related to an object on the current frame by using the selected feature amount and object information related to the object on the previous frame; and
an object attribute information calculation unit configured to calculate object attribute information related to the object on the current frame on the basis of the calculated object information related to the object on the current frame,
wherein:
the plurality of object feature amount calculation units includes a first object feature amount calculation unit configured to calculate, as a first object feature amount, a difference in luminance of corresponding pixels in a short-term background image and the current frame, and a second object feature amount calculation unit configured to calculate, as a second object feature amount, a difference in luminance of corresponding pixels in a long-term background image and the current frame,
the feature amount selection unit generates a difference image by selecting the first or second feature amount for each pixel by using a stoppage count value as the object attribute information related to the object on the previous frame,
the object information calculation unit comprises an object position calculation unit which calculates a positional vector as the object information related to the object on the current frame by using the generated difference image and a positional vector as the object information related to the object on the previous frame, and
the object attribute information calculation unit counts the stoppage count value as the object attribute information related to the object on the current frame on the basis of the positional vector as the calculated object information related to the object on the current frame.

2. The image processing device according to claim 1, wherein the object position calculation unit detects an object candidate on the current frame on the basis of the generated difference image and makes an object candidate on the current frame, a distance from which candidate to the object on the previous frame is the shortest, take over an object ID assigned to the object on the previous frame.

3. An image processing method of an image processing device that detects an object on a moving image, the method comprising:
an object feature amount calculating step of calculating a plurality of object feature amounts, which is related to an object on an image, from a current frame of the moving image on the basis of different standards;
a feature amount selecting step of selecting an object feature amount to be used from the plurality of object feature amounts, which is calculated on the basis of the different standards, by using object attribute information related to an object on a previous frame of the moving image;
an object information calculating step of calculating object information related to an object on the current frame by using the selected feature amount and object information related to the object on the previous frame;
an object attribute information calculating step of calculating object attribute information related to the object on the current frame on the basis of the calculated object information related to the object on the current frame, the steps being performed by the image processing device; and
a head detection region setting step of setting a head detection region,
wherein:
the object feature amount calculating step comprises calculating, as a first object feature amount, a whole-body region candidate of a person outside the head detection region in the current frame, and calculating, as a second object feature amount, a head region candidate of a person in the head detection region in the current frame,
the feature amount selecting step comprises designating a whole-body region and a head region in the previous frame one by one as a focused region, selecting the whole-body region candidate or the head region candidate in the current frame according to determination whether a central coordinate of a head in the focused region is in the head detection region, and specifying the selected candidate as a whole-body region or a head region in the current frame, the object information calculating step comprises an object position calculating step of calculating a positional vector of the specified whole-body region or head region as the object information related to the object on the current frame by using a positional vector of the focused region as the object information related to the object on the previous frame, and the object attribute information calculating step comprises calculating a central coordinate of a head in the whole-body region or a central coordinate in the head region as the object attribute information related to the object on the current frame on the basis of the positional vector of the whole-body region or the head region as the calculated object information related to the object on the current frame.

4. A non-transitory computer readable storage medium having computer readable instructions stored thereon that, when executed, cause a computer, which detects an object on a moving image, to function as a plurality of object feature amount calculation units configured to calculate a plurality of object feature amounts, which is related to an object on an image, from a current frame of the moving image on the basis of different standards, a feature amount selection unit configured to select an object feature amount to be used from the plurality of object feature amounts, which is calculated on the basis of the different standards, by using object attribute information related to an object on a previous frame of the moving image, an object information calculation unit configured to calculate object information related to an object on the current frame by using the selected feature amount and object information related to the object on the previous frame, an object attribute information calculation unit configured to calculate object attribute information related to the object on the current frame on the basis of the calculated object information related to the object on the current frame, and a head detection region setting unit configured to set a head detection region, wherein:

the plurality of object feature amount calculation units includes a first object feature amount calculation unit configured to calculate, as a first object feature amount, a whole-body region candidate of a person outside the head detection region in the current frame, and a second object feature amount calculation unit configured to calculate, as a second object feature amount, a head region candidate of a person in the head detection region in the current frame, the feature amount selection unit designates a whole-body region and a head region in the previous frame one by one as a focused region, selects the whole-body region candidate or the head region candidate in the current frame according to determination whether a central coordinate of a head in the focused region is in the head detection region, and specifies the selected candidate as a whole-body region or a head region in the current frame, the object information calculation unit comprises an object position calculation unit which calculates a positional vector of the specified whole-body region or head region as the object information related to the object on the current frame by using a positional vector of the focused region as the object information related to the object on the previous frame, and the object attribute information calculation unit calculates a central coordinate of a head in the whole-body region or a central coordinate in the head region as the object attribute information related to the object on the current frame on the basis of the positional vector of the whole-body region or the head region as the calculated object information related to the object on the current frame.

5. The image processing method according to claim 3, wherein the feature amount selecting step comprises selecting a head region candidate in the current frame a distance from which candidate to the focused region is the shortest, making the candidate take over an object ID of the focused region, and specifying the candidate as a head region in the current frame in a case where a central coordinate of a head in the focused region is in the head detection region, and selecting a whole-body region candidate in the current frame a distance from which candidate to the focused region is the shortest, making the candidate take over an object ID of the focused region, and specifying the candidate as a whole-body region in the current frame in a case where a central coordinate of the head in the focused region is not in the head detection region.

6. The non-transitory computer readable storage medium according to claim 4, wherein the feature amount selection unit selects a head region candidate in the current frame a distance from which candidate to the focused region is the shortest, makes the candidate take over an object ID of the focused region, and specifies the candidate as a head region in the current frame in a case where a central coordinate of a head in the focused region is in the head detection region, and selects a whole-body region candidate in the current frame a distance from which candidate to the focused region is the shortest, makes the candidate take over an object ID of the focused region, and specifies the candidate as a whole-body region in the current frame in a case where a central coordinate of the head in the focused region is not in the head detection region.

* * * * *